United States Patent
Shin

(10) Patent No.: US 8,692,797 B2
(45) Date of Patent: Apr. 8, 2014

(54) TOUCH RECOGNITION APPARATUS AND METHOD IN CAPACITIVE TOUCH SCREEN

(75) Inventor: Jong Woo Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 13/313,589

(22) Filed: Dec. 7, 2011

(65) Prior Publication Data

US 2012/0146941 A1 Jun. 14, 2012

(30) Foreign Application Priority Data

Dec. 14, 2010 (KR) .................. 10-2010-0127514

(51) Int. Cl.
*G06F 3/045* (2006.01)

(52) U.S. Cl.
USPC ............ 345/174; 327/517; 327/551; 345/173

(58) Field of Classification Search
USPC .......... 323/208, 316, 321; 324/322, 338, 403, 324/603, 647; 327/101, 517; 340/407.1, 340/407.2, 5.54, 5.83, 527, 539, 540; 345/1.3, 156, 157, 158, 161, 163, 166, 345/168, 169, 171, 173, 174, 175, 179, 204, 345/207, 211
See application file for complete search history.

(56) References Cited

U.S. PATENT DOCUMENTS

| | | | | |
|---|---|---|---|---|
| 6,310,611 B1* | 10/2001 | Caldwell | ........................ | 345/173 |
| 8,411,066 B2* | 4/2013 | Cordeiro et al. | ............... | 345/174 |
| 2009/0102813 A1* | 4/2009 | Mamba et al. | ................ | 345/174 |
| 2011/0018841 A1* | 1/2011 | Hristov | ......................... | 345/174 |
| 2011/0156800 A1* | 6/2011 | Lee et al. | ....................... | 327/517 |
| 2012/0146944 A1* | 6/2012 | Lee et al. | ....................... | 345/174 |
| 2012/0194476 A1* | 8/2012 | Lee et al. | ....................... | 345/174 |

* cited by examiner

*Primary Examiner* — Sumati Lefkowitz
*Assistant Examiner* — Douglas M Wilson
(74) *Attorney, Agent, or Firm* — Jefferson IP Law, LLP

(57) ABSTRACT

A touch recognition apparatus and method in a capacitive touch screen are provided. The touch recognition apparatus includes a touch panel and a controller. The touch panel includes a first sub panel and a second panel intersecting each other. The first sub panel includes a first electrode line and a second electrode line in X axis, and a plurality of resistors connected between the first electrode line and the second electrode line in X axis. The controller outputs scan signals to the first electrode line in X axis and the first electrode line in Y axis, receives scan sensing signals through the second electrode line in X axis and the second electrode line in Y axis, and measures delay times between the scan signals and the scan sensing signals to touched positions in X axis and Y axis, respectively.

11 Claims, 6 Drawing Sheets

X scan or
Y scan

TOUCH RECOGNITION APPARATUS AND METHOD IN CAPACITIVE TOUCH SCREEN

PRIORITY

This application claims the benefit under 35 U.S.C. §119(a) of a Korean patent application filed on Dec. 14, 2010 in the Korean Intellectual Property Office and assigned Serial No. 10-2010-0127514, the entire disclosure of which is hereby incorporated by reference.

BACKGROUND OF THE INVENTION

1. Field of the Invention

The present invention relates to a touch recognition apparatus and method in a capacitive touch screen. More particularly, the present invention relates to a touch screen using a parallel resistor and a method for recognizing a touch therein.

2. Description of the Related Art

In general, there are two types of touch screens, namely, a resistive touch screen and a capacitive touch screen. The resistive touch screen has a stacked arrangement, including thin metallic layers that are either electrically conductive or resistive, and detects a change in electric current, caused by a user's contact, to determine the presence of a touch. The capacitive touch screen is coated with materials capable of storing an electric charge and detects a change in capacitance, caused by a user's contact, to determine the presence of a touch.

FIG. 1 is a view illustrating a configuration of a capacitive touch screen according to the related art.

Referring to FIG. 1, a capacitive touch screen 10 includes an X-array and a Y-array. Upon receiving a touch input, the capacitive touch screen senses a variation in capacitance by a combination of the X-array and the Y-array to obtain X- and Y-coordinates. In the capacitive touch screen 10 shown in FIG. 1, a controller 20 sequentially outputs a scan control signal to respective X1, X2, X3, and X4 lines, and senses a variation in capacitance through signals of the Y1, Y2, Y3, and Y4 lines to determine a touched position. That is, the controller 20 scans Y lines connected to an X line in which a scan control signal is activated to sense touched X- and Y-coordinates in such a way that it senses a variation in capacitance in contact points of Y1-Y4 connected to an X1 line when an X1 scan control signal is activated, senses variation in capacitance in contact points of Y1-Y4 connected to an X2 line when an X2 scan control signal is activated, and so forth.

However, in the capacitive touch screen of the related art that uses array schemes with respect to X and Y axes, the number of arrays increases according to the size of the Liquid Crystal Display (LCD). That is, when a touch panel of the touch screen is large, there is a need for a plurality of arrays. Owing to this, the arrays and a structure for controlling the same are complicated. Because there are a large number of lines in the touch screen, the controller needs many scan lines and sensing lines. Furthermore, there is a need for a more complicated Integrated Circuit (IC) that is capable of driving a touch recognition process on the touch panel having the large number of lines and recognizing a touch occurrence.

SUMMARY OF THE INVENTION

Aspects of the present invention are to address at least the above-mentioned problems and/or disadvantages and to provide at least the advantages described below. Accordingly, an aspect of the present invention is to provide a touch screen that may reduce the number of arrays in a touch panel for sensing a touch on a touch screen to simplify a structure of the touch screen.

In accordance with an aspect of the present invention, a touch recognition apparatus in a capacitive touch screen is provided. The touch recognition apparatus includes a touch panel including a first sub panel and a second sub panel intersecting each other, the first sub panel including a first electrode line and a second electrode line in an X axis, a plurality of resistors being connected between the first electrode line and the second electrode line in the X axis, sub electrode lines being connected to access nodes of the resistors, the second sub panel including a first electrode line and a second electrode line in a Y axis, a plurality of resistors being serially connected between the first electrode line and the second electrode line in the Y axis, and sub electrode lines being connected to access nodes of the resistors, and a controller for outputting scan signals to the first electrode line in the X axis and the first electrode line in the Y axis, for receiving scan sensing signals through the second electrode line in the X axis and the second electrode line in the Y axis, and for measuring delayed times between the scan signals and the scan sensing signals to determine touched positions in the X axis and the Y axis, respectively.

In accordance with another aspect of the present invention, a touch recognition method in a capacitive touch screen is provided. The touch recognition method includes outputting scan signal in a first electrode line in an X axis and a first electrode in a Y axis in a touch panel of the capacitive touch screen including a first sub panel and a second sub panel intersecting each other, the first sub panel including the first electrode line and a second electrode line in the X axis, a plurality of resistors being connected between the first electrode line and the second electrode line in the X axis, sub electrode lines being connected to access nodes of the resistors, the second sub panel including the first electrode line and a second electrode line in the Y axis, a plurality of resistors being serially connected between the first electrode line and the second electrode line in the Y axis, and sub electrode lines being connected to access nodes of the resistors, receiving respective scan sensing signals through the second electrode line in the X axis and the second electrode line in the Y axis, measuring a delay time between the outputting of the scan signal and the receiving of the scan sensing signal, and analyzing the delay time to determine touched positions in the X axis or the Y axis.

When configuring a touch panel of a touch screen according to an exemplary embodiment of the present invention, because there are lines in only X+, X−, Y+, and Y−, the number of arrays may be significantly reduced. In addition, since the arrays may be simplified to move a controller of the touch screen to a direction of a Printed Circuit Board (PCB), this results in a reduction of cost.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In general, a multi-media device, such as a mobile terminal, is produced having a touch screen as an input and display component. More particularly, mobile terminals are recognized as a necessity of daily life based on the increasing number of functions they provide, as well as their multi-media reproducing capabilities. Accordingly, to provide a wider screen space and thus a larger viewing area, mobile terminal makers are providing mobile terminals with an enlarged touch screen. Exemplary embodiments of the present invention relate to a touch screen of a multi-media device such as a mobile terminal, and more particularly, to a structure of a capacitive touch screen.

Figure 1:
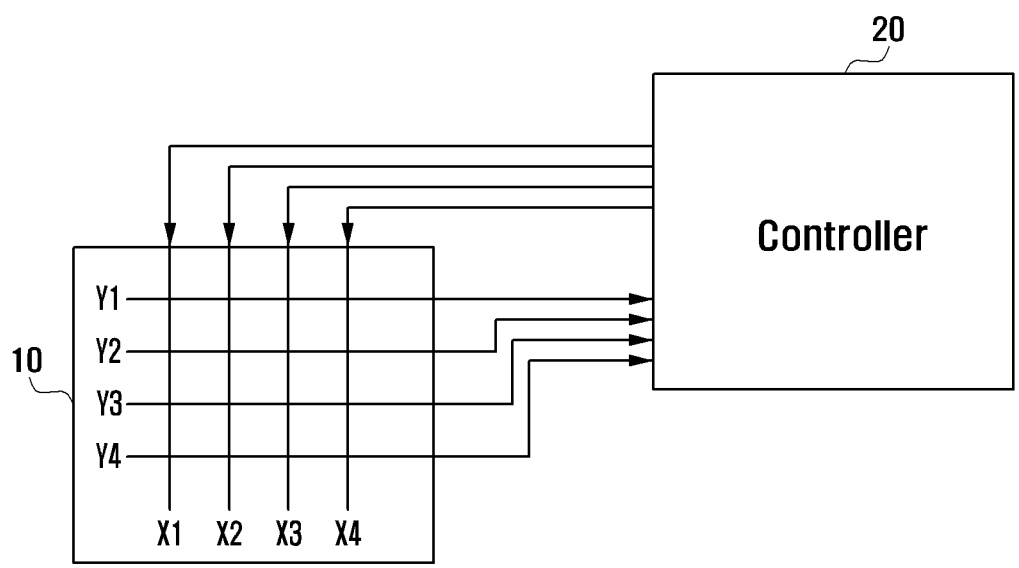
FIG. 1 is a view illustrating a configuration of a capacitive touch screen according to the related art.
Figure 2:
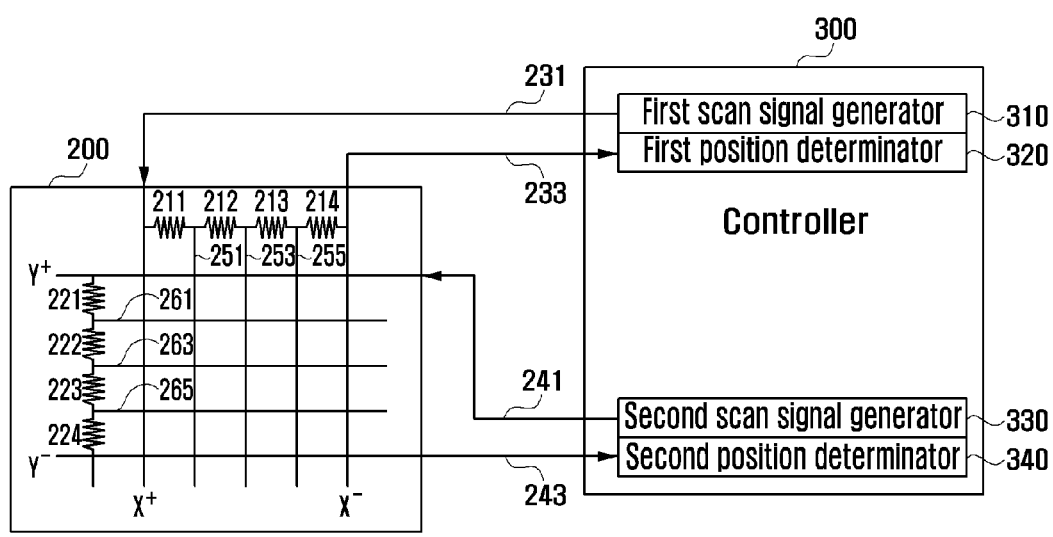
FIG. 2 is a block diagram illustrating a configuration of a touch screen according to an exemplary embodiment of the present invention.

FIG. 2 is a block diagram illustrating a configuration of a touch screen according to an exemplary embodiment of the present invention.

Referring to FIG. 2, a touch panel 200 has a structure in which electrodes for recognizing an X axis and a Y axis are arranged in a matrix pattern and respective ends of the electrodes are connected to each other through a resistor. In an exemplary implementation, the electrodes may be formed of a transparent and conductive metal material such as Indium Tin Oxide (ITO). The touch panel 200 includes a first sub panel and a second sub panel that intersect each other. Here, it is assumed that the first sub panel and the second panel have a 5*5 matrix structure. However, it is to be understood that this is merely for sake of explanation and not meant as a limitation regarding the size of the matrix structure. In this case, a first electrode line 231 and a second electrode line 233 in the X axis of the first sub panel connect with a controller 300. Sub electrode lines 251, 253 and 255 connect with each other between the first electrode line 231 and the second electrode line 233 in the X axis. A plurality of resistors 211, 212, 213 and 214 are connected among the first electrode line 231 in the X axis, the sub electrode lines 251~255, and the second electrode line 233 in the X axis. That is, the sub electrode lines 251~255 connect with access nodes between resistors, which are connected to the first electrode line 231 and the second electrode line 233 in the X axis in parallel. The resistors 211~214 connect with access nodes of the sub electrode lines 251~255 connected in parallel between the first electrode line 231 and the second electrode line 233 in the X axis.

A first electrode line 241 and a second electrode line 243 in the Y axis of the second panel connect with the controller 300. Sub electrode lines 261, 263, and 265 connect between the first electrode line 241 and the second electrode line 243 in the Y axis. A plurality of resistors 221, 222, 223 and 224 are connected among the first electrode line 241 in the Y axis, the sub electrode lines 261~265, and the second electrode line 243 in the Y axis. That is, the sub electrode lines 261~265 connect with access nodes between the resistors, which are connected to the first electrode line 241 and the second electrode line 243 in the Y axis in parallel. The resistors 221~224 connect with access nodes of the sub electrode lines 261~265 connected in parallel between the first electrode line 241 and the second electrode line 243 in the Y axis.

In this case, the touch panel 200 has contact points at which sub electrode lines in the X axis and sub electrode lines in the Y axis intersect, respectively. Further, the resistors 211~214 and the resistors 221~224 may have the same or different resistance values, and may be implemented with different values through experiment or based on different design requirements.

The controller 300 includes a first scan signal generator 310 for supplying a scan signal to the first electrode line 231 in the X axis, a first position determinator 320 for analyzing a signal received through the second electrode line 233 in the X axis to determine a position of the X axis in which capacitance changes due to touching, a second scan signal generator 330 for supplying a scan signal to the first electrode line 241 in the Y axis, and a second position determinator 340 for analyzing a signal received through the second electrode line 243 in the Y axis to determine a position of the Y axis in which capacitance changes due to touching. The controller 300 generates the scan signal in the electrode lines in the X and Y axes through the first and second scan signal generators 310 and 330. When capacitance changes on the touch panel due to touching, the controller 300 determines respective X and Y positions in which capacitance changes from the first and second position determinators 320 and 340 to recognize the X and Y axes in which a touch occurs.

Figure 3A:
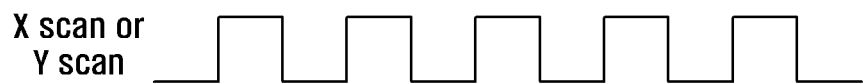
FIG. 3A and FIG. 3B are views illustrating characteristics of a scan signal applied to a touch panel and characteristics of a signal output from the touch panel, respectively, according to an exemplary embodiment of the present invention.
Figure 3B:
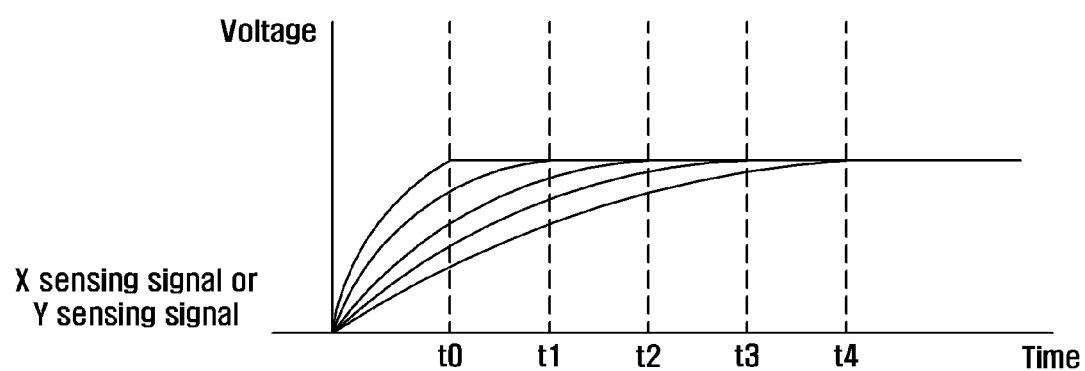

FIG. 3A and FIG. 3B are views illustrating characteristics of a scan signal applied to a touch panel and characteristics of a signal output from the touch panel, respectively, according to an exemplary embodiment of the present invention.

FIG. 3A illustrates a scan signal applied to the touch panel 200 through the first electrode line 231 in the X axis and the second electrode line 241 in the Y axis. FIG. 3B illustrates a scan sensing signal that is received by the controller 300 through the second electrode line 233 in the X axis and the second electrode line 243 in the Y axis, the scan sensing signal being generated as a result of the scan signal, as illustrated in FIG. 3A, being transmitted through the touch panel 200. In this case, the scan sensing signal has different delay periods according to variations in resistance and capacitance corresponding to a touched position as shown in FIG. 3B.

The following Table 1 lists a combination of resistances and capacitances for determining a delay period of the scan sensing signal as shown in FIG. 3B.

TABLE 1

| Scan sensing signal | X axis | Y axis | Remark |
| --- | --- | --- | --- |
| t0 | No touch | No touch | Delay period according to characteristics of touch panel 200 itself |
| t1 | Touch line 251 | Touch line 261 | Determine delay period due to resistor 211 or 221 and capacitance |
| t2 | Touch line 253 | Touch line 263 | Determine delay period due to resistors 211-212 or 221-222 and capacitance |
| t3 | Touch line 255 | Touch line 265 | Determine delay period by resistors 211-213 or 221-223 and capacitance |
| t4 | Touch line 233 | Touch line 243 | Determine delay period due to resistors 211-214 or 221-224 and capacitance |

If a touch occurs at a point on the touch panel 200, capacitance in a corresponding position varies. Also, delay of the scan signal varies according to a time constant corresponding to the number of resistors connected to sub electrode lines and capacitance, thus generating a scan sensing signal as illustrated in Table 1. Accordingly, the controller 300 may generate and transmit the scan signal, receive the scan sensing signal through the touch panel 200, and measure respective time delay periods of the received scan sensing signals in the X and the Y axes, which are variously delayed in the touch panel 200 according to a touch position, to determine touched positions in the X and the Y axes.

In an exemplary implementation, the capacitive touch panel 200 may include two sub panels, namely, first and second sub panels. Each electrode of the sub panels may be formed by ITO. The sub panels have a panel size capable of recognizing a change in capacitance in response to an external touch. Each of the first and second sub panels may have electrode lines arranged transversely from electrode lines of the other sub panel. For example, the first sub panel may have electrode lines arranged in the X axis direction while the second sub panel may have electrode lines arranged in the Y axis direction. In an exemplary embodiment of the present invention, each sub panel supplies a scan signal through one electrode line and receives a signal for sensing the presence of a touch through another electrode line. That is, in an exemplary embodiment of the present invention, if a point is touched, capacitance at a location corresponding to the touched point varies (for example, capacitance at the corresponding position is increased upon touching), and the controller may sense a time delay value according to a resistance and capacitance in electrode lines in the X and the Y axes to determine the positions in the X and the Y axes corresponding to the touched position.

An exemplary method for sensing a touched position in an X direction when a touch occurs on the touch panel 200 will be described. A first scan signal generator 310 of the controller 300 generates a scan signal as illustrated in FIG. 3A and applies the scan signal to the first electrode line 231. Determination of whether a touch occurs on one of the sub sensing lines 251~255 is made based on variations of the scan signal, which is altered according to variations in resistance of resistors 211~214 and in capacitance due to a received touch as shown in FIG. 3B. For example, when a touch does not occur, a scan sensing signal of a high level is generated at a time point t0 of FIG. 3B based on a time constant corresponding to the inherent resistance and capacitance of the first sub panel. If a touch occurs on the sub sensing line 251, a touch sensing signal is generated at a delay time t1 according to a time constant corresponding to resistance of the resistor 211 and capacitance of the touch. If a touch occurs on the sub sensing line 253, a touch sensing signal is generated at a delay time t2 according a time constant corresponding to resistance of the resistors 211~212 and capacitance of the touch. If a touch occurs on the sub sensing line 255, a touch sensing signal is generated at a delay time t3 according to a time constant corresponding to resistance of the resistors 211~213 and a capacitance of the touch. As illustrated in FIG. 3B, the delay times t1, t2 and t3 may each be a time point when the touch sensing signal becomes logic high. Accordingly, the first position determinator 320 may sense a delay time according to a variation in resistance and capacitance to determine the touch position in the X axis direction.

Subsequently, the first and second position determinators 320 and 340 analyze received signals to determine delay times and the positions in the X and the Y axes, respectively.

Figure 4:
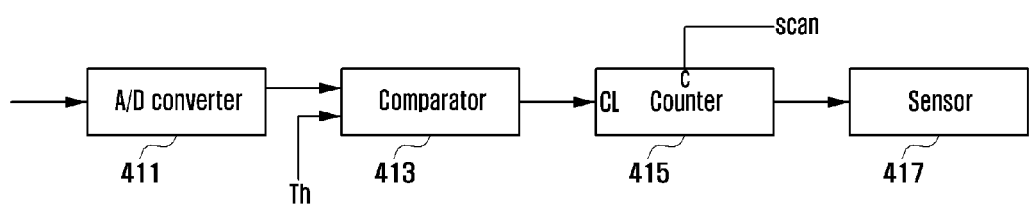
FIG. 4 is a block diagram illustrating a configuration of an X or Y axis position determinator according to an exemplary embodiment of the present invention.

FIG. 4 is a block diagram illustrating a configuration of an X or Y axis position determinator according to an exemplary embodiment of the present invention.

Referring to FIG. 4, each of the X and Y axis position determinators includes an Analog/Digital (A/D) converter 411 for converting a received scan sensing signal into digital data, a comparator 413 for comparing the digital data with a threshold value and for generating a comparison result signal when the digital data exceed the threshold value, a counter 415 activated upon generation of the scan sensing signal for counting a generating time of the comparison result signal to determine a time delay of the scan sensing signal, and a sensor 417 for analyzing a time delay based on output of the counter 415 and for determining a touch position in the X or the Y axis.

In this case, the A/D converter 411, the comparator 413, and the counter 415 may be components of a delay time measuring unit for determining a time delay between transmission of the scan signal and reception of the scan sensing signal. That is, the A/D converter 411 converts a scan sensing signal into digital data. The comparator 413 compares the digital data with a preset threshold value to set a time delay interval in which the scan sensing signal increases to a normal voltage level of the scan signal. The counter 413 counts the delay time interval, and the sensor 417 uses the counted value for determining a position of a sub electrode line at which a touch occurs in a corresponding direction. An exemplary operation of the sensor 417 having a construction as mentioned above will be explained. The sensor 417 outputs a scan control signal as illustrated in FIG. 3A to the first electrode line 231. When the scan control signal is in a high logic time interval, the counter 415 is activated to start a counting operation. Further, the A/D converter 411 samples a signal received through the second electrode line 233 with a predetermined time interval (i.e., sampling period) to generate an A/D conversion signal. Here, the sampling period of the A/D converter 411 should have a time period shorter than an activated time interval (i.e., a logic high time interval), and have a time period shorter than a time interval t0-t1 (t1-t2, t2-t3 . . . ) in FIG. 3B. The A/D converter 411 A/D converts a signal received through the second electrode line 233. In this case, the A/D converter 411 outputs different values according to variation in capacitance corresponding to the presence of a touch at different locations on the touch panel 200. That is, the A/D converter 411 generates logic high digital data with different time delays according to variations in resistance of resistors 211~214 and in capacitance.

The comparator 413 compares the output of the A/D converter 411 with a preset threshold Th. In this case, the threshold Th may be set as a logic high value or a value slightly smaller. Accordingly, if a signal received through the second electrode line 233 indicates that the touch panel 200 is not touched, the comparator 413 generates a count stop signal of logic high at a time point t0. Accordingly, the comparator 413 generates a signal corresponding to a time delay period for determining a touched position in the X axis direction.

The counter 415 counts the time delay interval to generate a delay period signal during an activated time interval of the scan signal. The counter 415 starts a counting operation when a scan signal, as shown in FIG. 3A, is activated, and terminates the counting operation when the comparator 413 generates a comparison result signal. Accordingly, a scan sensing signal is generated as illustrated in FIG. 3B, the counter 415 creates a counting value corresponding to the time interval t0, t1, t2, or t3. Accordingly, the sensor 417 evaluates the counting value to generate a signal corresponding to a sensed position in the X axis. In this case, the sensor 417 may include respective data for sensing positions of the sub electrode lines 251~255 in the X axis. The sensor 417 compares counting data output from the counter 415 with the respective data to determine the position on the X axis.

Furthermore, the second position determinator 340 includes a configuration as illustrated in FIG. 4. When a touch occurs at an optional point of the touch panel 200 in the foregoing manner, the second position determinator 340 may sense the positions of sub electrode lines 261~265 in the Y axis. Accordingly, the controller 300 may determine X- and Y-coordinates being a final position in which a touch occurs from positions in the X and the Y axes. In this case, the controller 300 may include key maps or item (icon, folder, etc.) maps corresponding to the X- and Y-coordinates. Accordingly, if a touch occurs at an optional point on the touch panel 200, the controller 300 may set a corresponding function based on mapping data corresponding to the position to control an operation of a device.

Figure 5:
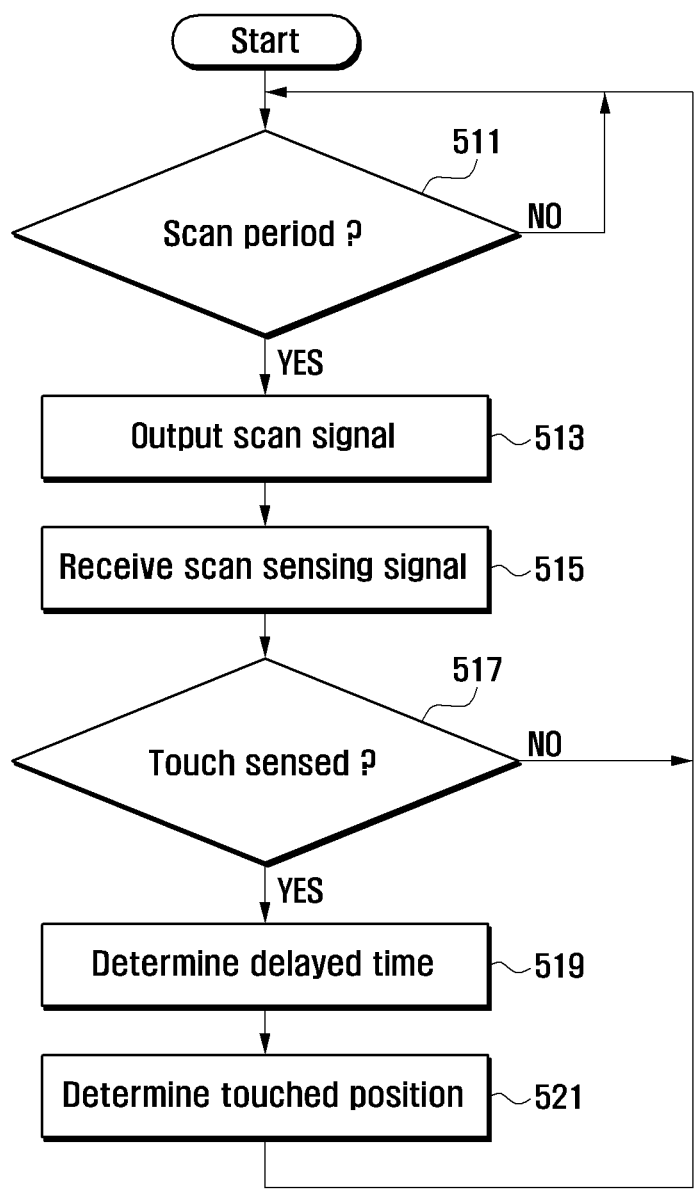
FIG. 5 is a flowchart illustrating a method for determining a position of a touch panel according to an exemplary embodiment of the present invention.

FIG. 5 is a flow-chart illustrating a method for determining a position of a touch panel according to an exemplary embodiment of the present invention.

Referring to FIG. 5, the controller 300, which may include an internal memory, may store determination reference data (e.g., threshold Th) for determining the presence of a touch on the touch panel 200, delay reference data according to a delay period until a touch signal is generated according to resistance in the resistors 211~214 and 221~224 and capacitance created upon touching, and position reference data for determining a touched position for the delay data in the memory. Further, the controller 300 may store mapping tables (key maps and item maps) corresponding to X and Y positions of the touch panels in the memory.

The controller 300 determines if a scan period occurs in step 511 and, when a scan period occurs, outputs a scan signal as illustrated in FIG. 3A through the first electrode line 231 in the X axis and the first electrode line 241 in the Y axis in step 513. The controller 300 receives a scan sensing signal through the second electrode line 233 in the X axis and the second electrode line 243 in the Y axis in step 515. In this case, the scan sensing signal is a signal in the form of FIG. 3B according to the presence of a touch and a touched position. At this time, the controller 300 generates the scan signal and measures a received time of the scan sensing signal to determine the presence of a touch. That is, the controller 300 measures a delay period from the time a scan sensing signal is received after generation of the scan signal to determine the presence of a touch and a touched position upon sensing the touch.

At this time, if the delay between the scan signal and the scan sensing signal is less than a preset time (i.e., when the scan sensing signal is received before a time point t0 in FIG. 3B), the controller 300 determines that a touch is not sensed in step 517 and returns to step 511. In this case, the scan sensing signal is received through the first electrode line 233 in the X axis and the second electrode line 243 in the Y axis, and the controller 300 measures time delay periods of the respective scan sensing signals to determine the presence of a touch.

Conversely, if the touch is sensed (i.e., the X axis and/or the Y axis scan sensing signal is received at a time point after time point t0), the controller 300 senses the touch in step 517, and determines a delay time caused by the touch in step 519. In this case, in a procedure of determining the delay time, the time between reception of the scan sensing signal, as illustrated in FIG. 3B, after transmission of the scan signal, as illustrated in FIG. 3A, is determined. Determining reception of the scan sensing signal may be achieved when the scan sensing signal exceeds a preset threshold Th. In this case, the threshold Th may be set to a voltage level similar to a voltage level at which the scan signal was transmitted. At this time, the controller 300 determines a time delay of the scan sensing signals in the X axis and the Y axis, respectively. The controller 300 determines a touched position on the touch panel 200 according to time delay periods in the X axis and the Y axis, and processes an input according to the determined touched position in step 521. In an exemplary embodiment, the controller 300 may determine the touched position by referring to a mapping table.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A touch recognition apparatus in a capacitive touch screen, the apparatus comprising:

a touch panel including a first sub panel and a second sub panel intersecting each other, the first sub panel including a first electrode line and a second electrode line in an X axis, a plurality of resistors being connected between the first electrode line and the second electrode line in the X axis, sub electrode lines being connected to access nodes of the resistors, the second sub panel including a first electrode line and a second electrode line in a Y axis, a plurality of resistors being serially connected between the first electrode line and the second electrode line in the Y axis, and sub electrode lines being connected to access nodes of the resistors; and a controller for outputting scan signals to the first electrode line in the X axis and the first electrode line in the Y axis, for receiving scan sensing signals through the second electrode line in the X axis and the second electrode line in the Y axis, and for measuring delay times between the scan signals and the scan sensing signals to determine touched positions in the X axis and the Y axis, respectively.

2. The apparatus of claim 1, wherein the controller comprises a first position determinator for determining a position in the X axis and a second position determinator for determining a position in the Y axis, and wherein each of the first and second determinators comprises:

a delay measuring unit for measuring a delay time between generation of the scan signal and reception of the scan sensing signal; and a sensor for analyzing the delay time output from the delay measuring unit to determine the position in the X axis or the Y axis.

3. The apparatus of claim 2, wherein the delay measuring unit comprises:

a converter for converting the scan sensing signal into digital data;

a comparator for comparing the digital data with a threshold value and for generating a comparison result signal when the digital data exceed the threshold value; and a counter, activated when the scan signal is generated, for counting a generation time of the comparison result signal to measure a delay time of the scan sensing signal.

4. The apparatus of claim 3, wherein the controller further comprises a key and an item mapping table corresponding to a position of a touch panel, determines the positions in the X axis and the Y axis through the sensor, and processes a key or an item of a mapping table corresponding to the determined positions in the X axis and the Y axis.

5. The apparatus of claim 2, wherein the scan signal comprises a square wave, having an off voltage and an on voltage, output by the controller at a predefined scan period.

6. The apparatus of claim 2, wherein the delay measuring unit determines that the scan sensing signal is received when a voltage level of the scan sensing signal increases to the on voltage level of the scan signal.

7. A touch recognition method in a capacitive touch screen, the method comprising:

outputting a scan signal in a first electrode line in an X axis and a first electrode line in a Y axis in a touch panel of the capacitive touch screen including a first sub panel and a second sub panel intersecting each other, the first sub panel including the first electrode line and a second electrode line in the X axis, a plurality of resistors being connected between the first electrode line and the second electrode line in the X axis, sub electrode lines being connected to access nodes of the resistors, the second sub panel including the first electrode line and a second electrode line in the Y axis, a plurality of resistors being serially connected between the first electrode line and the second electrode line in the Y axis, and sub electrode lines being connected to access nodes of the resistors;

receiving respective scan sensing signals through the second electrode line in the X axis and the second electrode line in the Y axis;

measuring a delay time between the outputting of the scan signal and the receiving of the scan sensing signal; and analyzing the delay time to determine touched positions in the X axis or the Y axis.

8. The method of claim 7, wherein the measuring of the delay time comprises:

converting the scan sensing signal into digital data;

comparing the digital data with a threshold value and generating a comparison result signal when the digital data exceed the threshold value; and counting, beginning when the scan signal is generated, a generation time of the comparison result signal to measure the delay time of the scan sensing signal.

9. The method of claim 8, wherein the touch screen comprises a key and an item mapping table corresponding to a position of a touch panel, the method further comprising processing a key or an item of a mapping table corresponding to determined positions in the X axis and the Y axis.

10. The method of claim 8, wherein the outputting of the scan signal comprises outputting a square wave, having an off voltage and an on voltage, at a predefined scan period.

11. The method of claim 10, wherein the counting of the generation time comprises determining that the scan sensing signal is received when a voltage level of the scan sensing signal increases to the on voltage level of the scan signal.

* * * * *